(12) United States Patent
Brazier

(10) Patent No.: US 12,403,966 B2
(45) Date of Patent: Sep. 2, 2025

(54) TRACK ASSEMBLY WITH RESILIENT AXLE SUSPENSION SUPPORTS

(71) Applicant: Glen Brazier, Karlstad, MN (US)

(72) Inventor: Glen Brazier, Karlstad, MN (US)

( * ) Notice: Subject to any disclaimer, the term of this patent is extended or adjusted under 35 U.S.C. 154(b) by 561 days.

(21) Appl. No.: 17/803,408

(22) Filed: Jun. 24, 2022

(65) Prior Publication Data

US 2023/0415830 A1    Dec. 28, 2023

(51) Int. Cl.
| | |
|---|---|
| *B62D 55/108* | (2006.01) |
| *B62D 55/10* | (2006.01) |
| *B62D 55/12* | (2006.01) |
| *B62D 55/14* | (2006.01) |
| *B62D 55/24* | (2006.01) |
| *B62D 55/30* | (2006.01) |

(52) U.S. Cl.
CPC ......... *B62D 55/1086* (2013.01); *B62D 55/10* (2013.01); *B62D 55/12* (2013.01); *B62D 55/14* (2013.01); *B62D 55/24* (2013.01); *B62D 55/30* (2013.01)

(58) Field of Classification Search
CPC .............. B62D 55/0186; B62D 55/104; B62D 55/14
See application file for complete search history.

(56) References Cited

U.S. PATENT DOCUMENTS

| | | | | |
|---|---|---|---|---|
| 6,234,590 | B1 * | 5/2001 | Satzler | B62D 55/1086 305/132 |
| 10,597,098 | B2 * | 3/2020 | Vik | B62D 55/1086 |
| 10,766,548 | B2 * | 9/2020 | Wagner | B62D 55/104 |
| 2003/0034189 | A1 * | 2/2003 | Lemke | B62D 55/1086 180/116 |
| 2011/0309672 | A1 * | 12/2011 | Thorson | B62D 55/15 305/138 |

* cited by examiner

*Primary Examiner* — Jason R Bellinger
(74) *Attorney, Agent, or Firm* — Douglas L Tschida

(57) ABSTRACT

An endless track assembly that mounts to a vehicle drive linkage. The track assembly includes a belted track, drive sprocket and sets of internal idler/road wheels that support interior track surfaces. Road axles having an appended, radially extending flange couple to axle housings at the framework shaped to contain one or more resilient cushions and an axle wear plate. The resilient cushions are supported in mating cooperation with channels at the axle flange and channels and appendages at the axle housings to independently compress and expand with road axle movement relative to the track framework over undulating terrain.

20 Claims, 12 Drawing Sheets

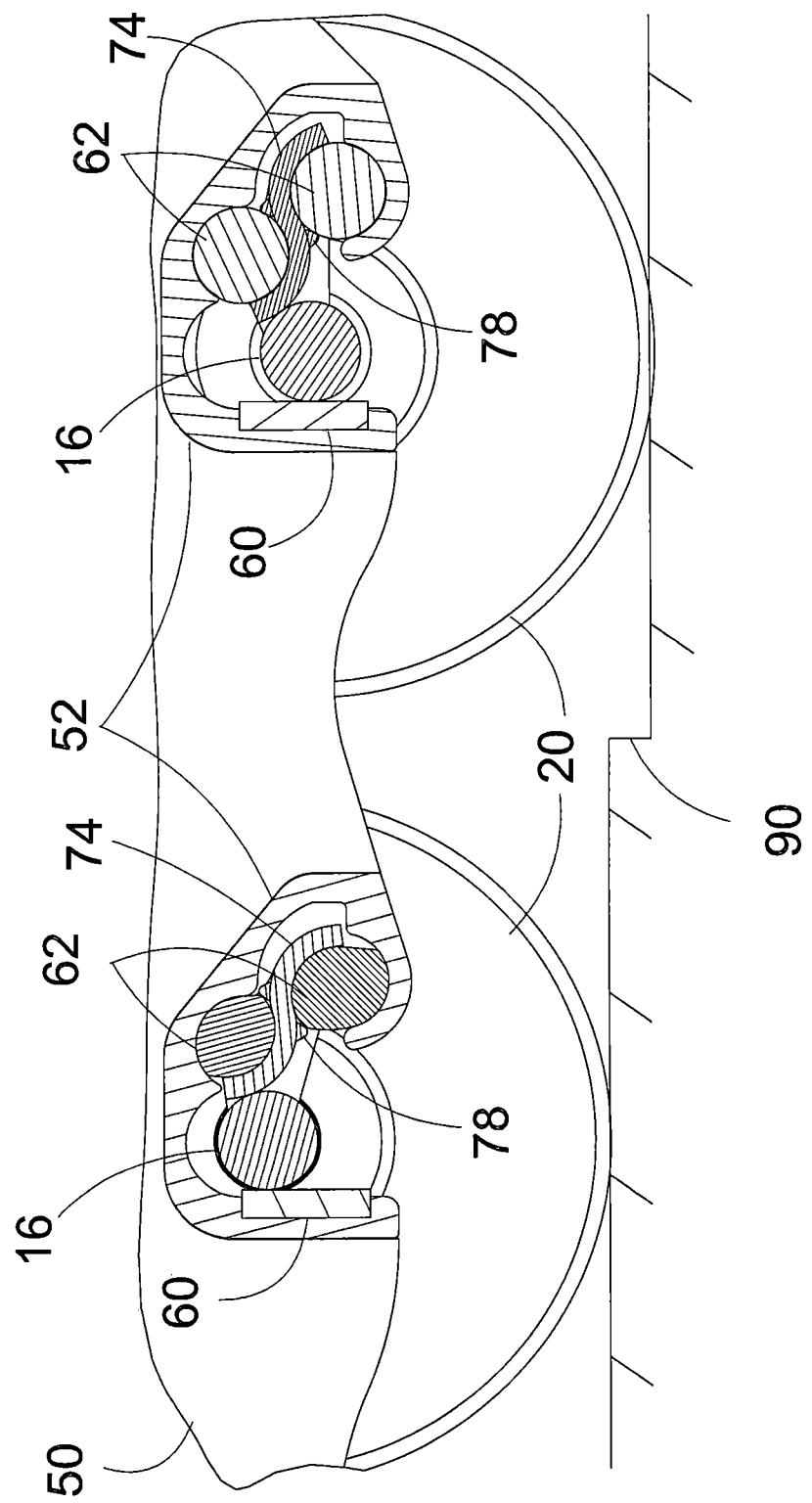

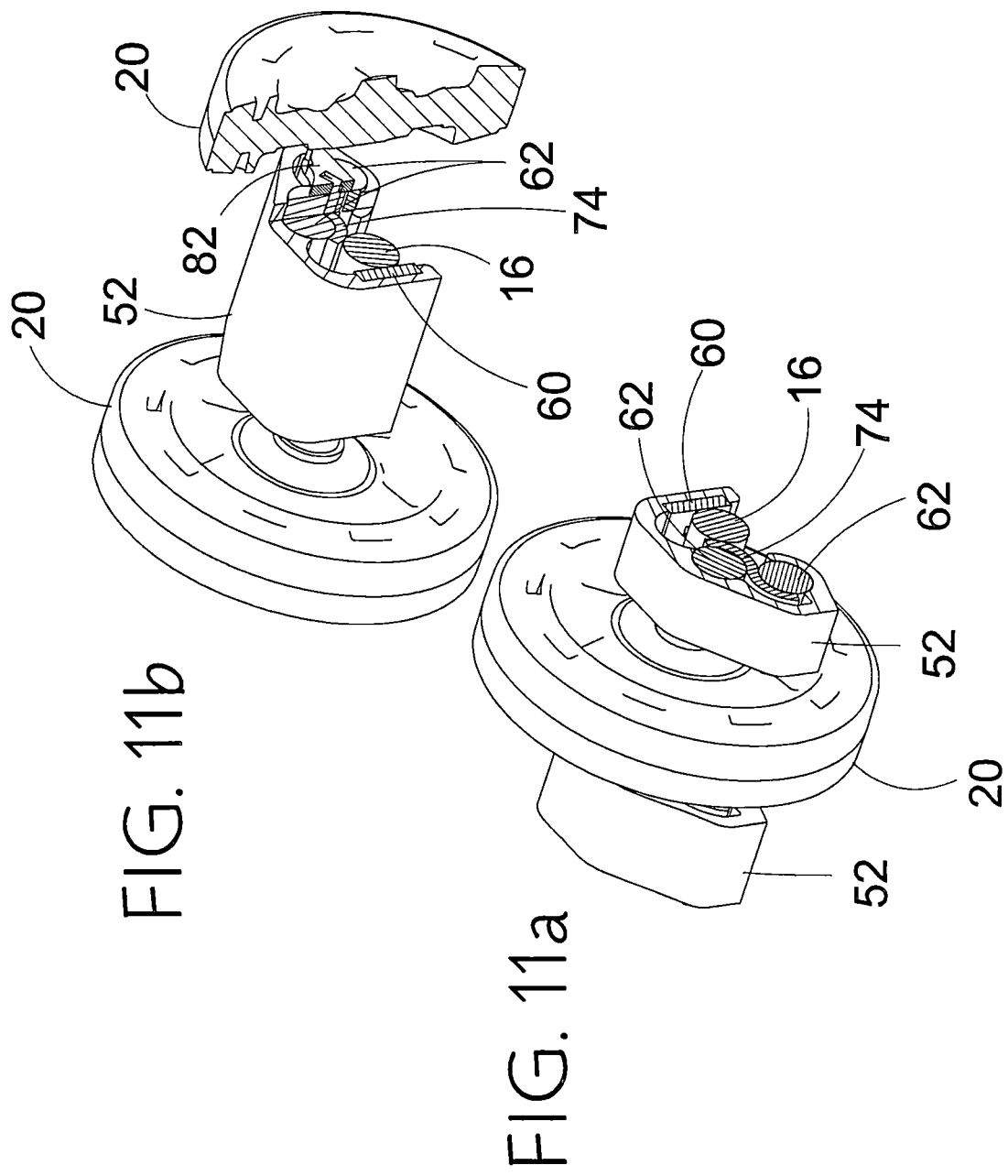

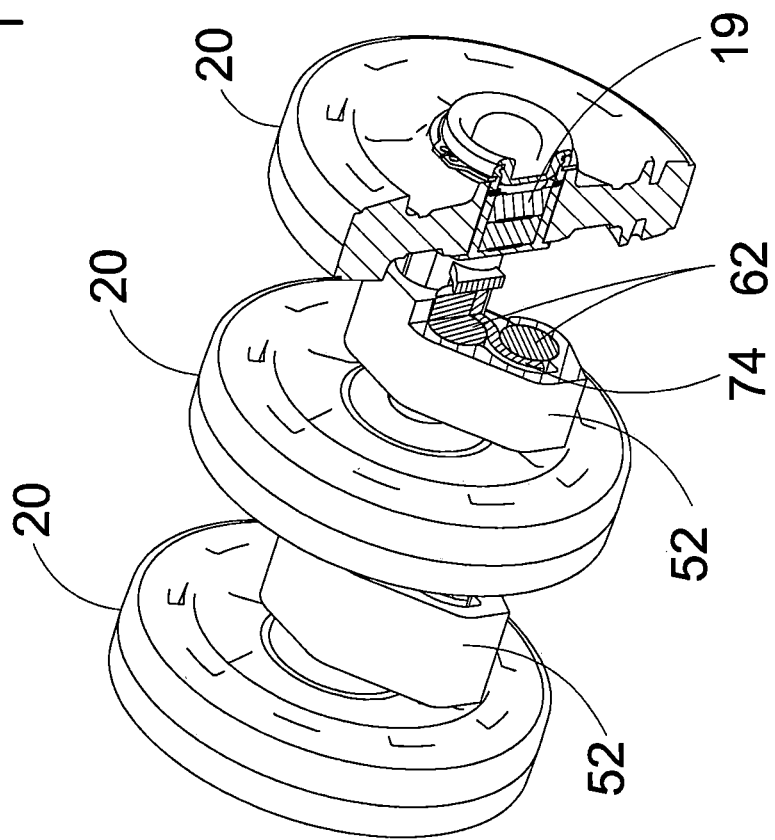

TRACK ASSEMBLY WITH RESILIENT AXLE SUSPENSION SUPPORTS

BACKGROUND OF THE INVENTION

The present invention relates to tracked vehicles and, in particular, to a shape changing track assembly wherein a number of idler or road wheel axles supported to a track framework include one or more flanges that project from the axles and mount within cavities of housings secured to the framework or cavities formed in the framework that support elastomer cushions and wherein the cushions interact with rotation of the flanges to resiliently and independently support movement of each axle at the framework.

A wide variety of personal and commercial all terrain vehicles have been developed for travel over off-road terrain such as desert, tundra, river beds, sodden fields and other unfriendly surface conditions including mud, sand, rocks, timber etc. These vehicles typically support at least one pair of track assemblies from a chassis mounted suspension. Some of the track assemblies permit conversion of wheeled vehicles to track vehicles.

Of the latter type of track assemblies, some also provide for pivoting idler or wheel supports that follow changes in terrain contours and control and counter-act track flexion. U.S. Pat. Nos. 6,904,986; 7,131,508; 7,533,741; and 7,597,161 disclose track assemblies of the foregoing types.

The foregoing assemblies and others in addition to supporting the axles from rocker suspensions commonly support the idler/road wheels from elastomer encapsulated axles. That is, the axles are bedded or encapsulated in a concentric elastomer and surrounding steel bushing, pillow block or the like. As the track moves over the terrain and flexes multi-directionally, the track support wheels rise, fall and pivot with the track as determined by the track suspension. Bedding the axles in an elastomer bushing permits axle movement to further facilitate track flexion. Axle movement is however limited by the thickness of the elastomer bedding and concentric relationship.

In contrast, the present axle suspension provides axles that support the track assembly support wheels that include one or more projecting flanges. The flanges radiate from the outer surface of each axle and are adapted to interact with the framework or housings secured to the framework that support resilient cushions. The cushions are mounted to engage the flange(s) and expand and contract to resist axle movement. The improved axles and mounting to the track framework and/or within the included housings enhances the range of resilient, independent motion of each axle and supported wheels.

SUMMARY OF THE INVENTION

It is a primary object of the invention to provide an improved axle suspension at track assemblies adapted to mount to a passive or actively powered vehicle.

It is further object of the invention to provide a track assembly wherein a track framework supports a plurality of wheels mounted in contact with interior surfaces of the track and wherein a support axle of each wheel is allowed to pivot, rise and fall at the framework independent of the other axles and resiliently contact elastomer members fitted to the framework.

It is further object of the invention to provide a drive track assembly wherein a track support framework supports a plurality of seriatim cross axles fitted to bearings at each idler/road wheel and wherein each axle is mounted to the framework independent of the other idler/road wheels and can independently pivot in the framework as the wheels maintain contact with the bottom interior surfaces of the track as the track traverses underlying terrain.

It is further object of the invention to provide a drive track assembly wherein an axle fitted to each idler wheel is supported to the framework and mounted to pivot, rise and fall in resilient contact with the framework and elastomer cushions interconnected between appending flange(s) at the axles and housings secured to the framework or portions of the framework having cavities that support the cushions.

It is further object of the invention to provide a drive track assembly wherein the framework is configured to provide a number of housings having cavities adapted to each receive an axle fitted to an idler/road wheel such that a flange plate that extends from the axle is supported between a lateral wear plate and a plurality of channels in each housing that contain resilient cushions that engage and resist movement of the axle and axle flange such that the axle is free to pivot, rise and fall.

It is further object of the invention to provide a drive track assembly wherein a series of wheel support axles are secured within cavities included at an axle support framework or housings secured to the framework to each contain a wear plate and an axle having an appended flange plate that radiates, projects or extends from the axle and wherein cross channels support one or more resilient cushions that interact with each flange plate to permit each axle and idler/road wheel to independently and resiliently pivot, rise and fall relative to the framework.

The present invention was developed to provide an improved track conversion assembly for a variety of vehicles accommodative of a smoother vehicle ride. A belted track of the assembly is supported in endless fashion about a drive sprocket and several sets of internal idlers (i.e. un-powered) or road wheels. Each idler/road wheel mounts to an axle having an appended flange and each axle laterally spans the framework. A plurality of resilient cushions are fitted to the framework or housings secured to the framework to engage the axle flanges and resist relative movement of the track framework and axles as the wheels engage uneven surface conditions.

In one construction the track framework particularly supports a number of flanged axles at open-sided housings or cavities formed at the framework. Each cavity is adapted to capture a lateral wear plate that contacts one side of the axle. A flange plate is appended to and radiates from the axle and mounts within the housings or framework cavities. A plurality of resilient members (typically formed from an elastomer) are supported in lateral channels at the housings or framework and are positioned to engage the flange plate to suspend the axle and resist movement of the axle. The elastomer members resiliently compress and expand to oppose flange movement yet permit the axles to pivot, rise and fall with undulations of the terrain.

Presently each road axle supports at least one pair of idler/road wheels at opposite axle ends. Modular housings adapted to contain resilient cushions and interact with the axle flanges are also disclosed that can be fitted to a framework to laterally support any number of track support wheels. Examples of one-, two- and three-wheel housing mountings are disclosed. The size, shape and number of housings can be adapted to the load capacity requirements of a track system. Inserts having appropriate interior contoured surfaces to support the wear plate and appropriate resilient cushions can also be adapted to mount to the housings.

A reciprocating, longitudinally extensible tensioner cooperates with end-mounted road wheels also fitted to the framework to control track tension. A separate rotational tensioner can be adapted to the framework to rotate the drive sprocket in an eccentric/off-center fashion relative to the rotational axis of a drive axle extending from the vehicle to establish appropriate track tension.

A torsion support assembly mounted to the track assembly between the vehicle framework and track framework restricts movement of the track assembly. The torsion support cooperatively resists vertical movement and rotation of the track assembly to prevent the track assembly from engaging the vehicle as surface conditions pivot the track assembly about a passive or active vehicle drive axle.

The subject track assemblies find particular application for trucks and other multi-axle vehicles and equipment that transport heavy loads. The elongated assemblies distribute load weight over a significantly larger load bearing footprint than achievable with existing commercial wheel replacement track assemblies.

The foregoing objects, advantages and distinctions of the invention are obtained in alternative track assemblies disclosed and discussed below. Still other objects, advantages, distinctions, constructions and combinations of individual features of the invention will become more apparent from the following description with respect to the appended drawings. Similar components, assemblies and sub-assemblies are referred to in the various drawings with similar alphanumeric reference characters. The description to each feature and/or combination should therefore not be literally construed in limitation of the invention. Rather, the invention should be interpreted within the broad scope of the further appended claims.

BRIEF DESCRIPTION OF THE DRAWINGS

FIG. 10 shows a view wherein the left side idler/road wheel axle is elevated and the flange pivoted to compress the coupled elastomer supports and wherein the right idler/road wheel axle is in a rest position with no axle or flange movement.

FIGS. 11a, 11b and 11c show perspective cross-sectioned assembly views of several arrangements of housing modules adapted to support exemplary one, two, and three idler/road wheels and wherein one or more flanges appending from the idler/road axles resiliently interact with resilient cushions contained in the housings and which housings are appropriately sized and shaped to rigidly mount to the track framework and laterally displace the wheels over the terrain.

BRIEF DESCRIPTION OF THE PREFERRED EMBODIMENT

Figure 1:
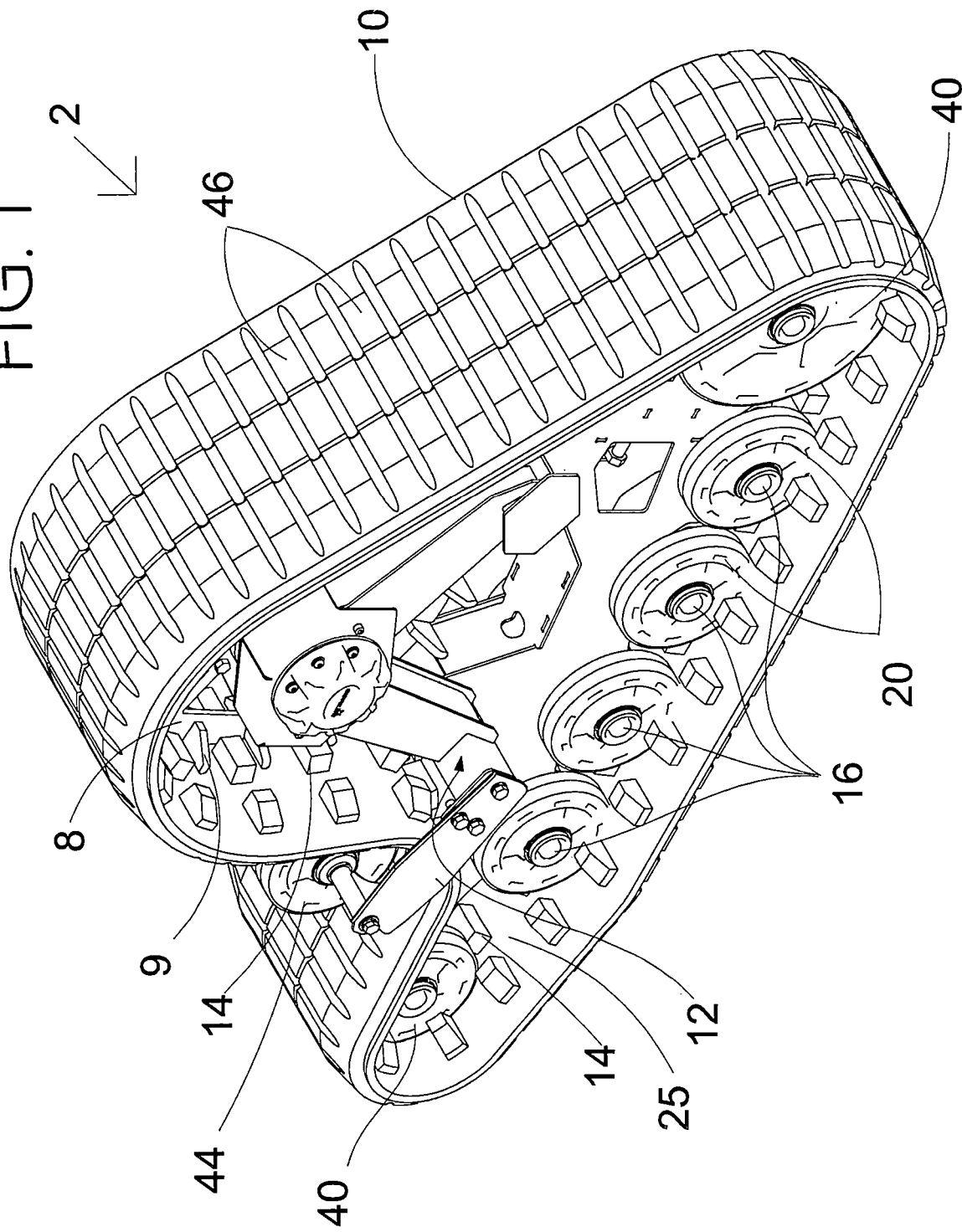
FIG. 1 is a perspective drawing showing the front, top and aft end of a track assembly of the invention with generalized track drive lugs including a plurality of idler/road wheels that are mounted to resiliently and independently pivot, rise and fall relative to the track framework.
Figure 2:
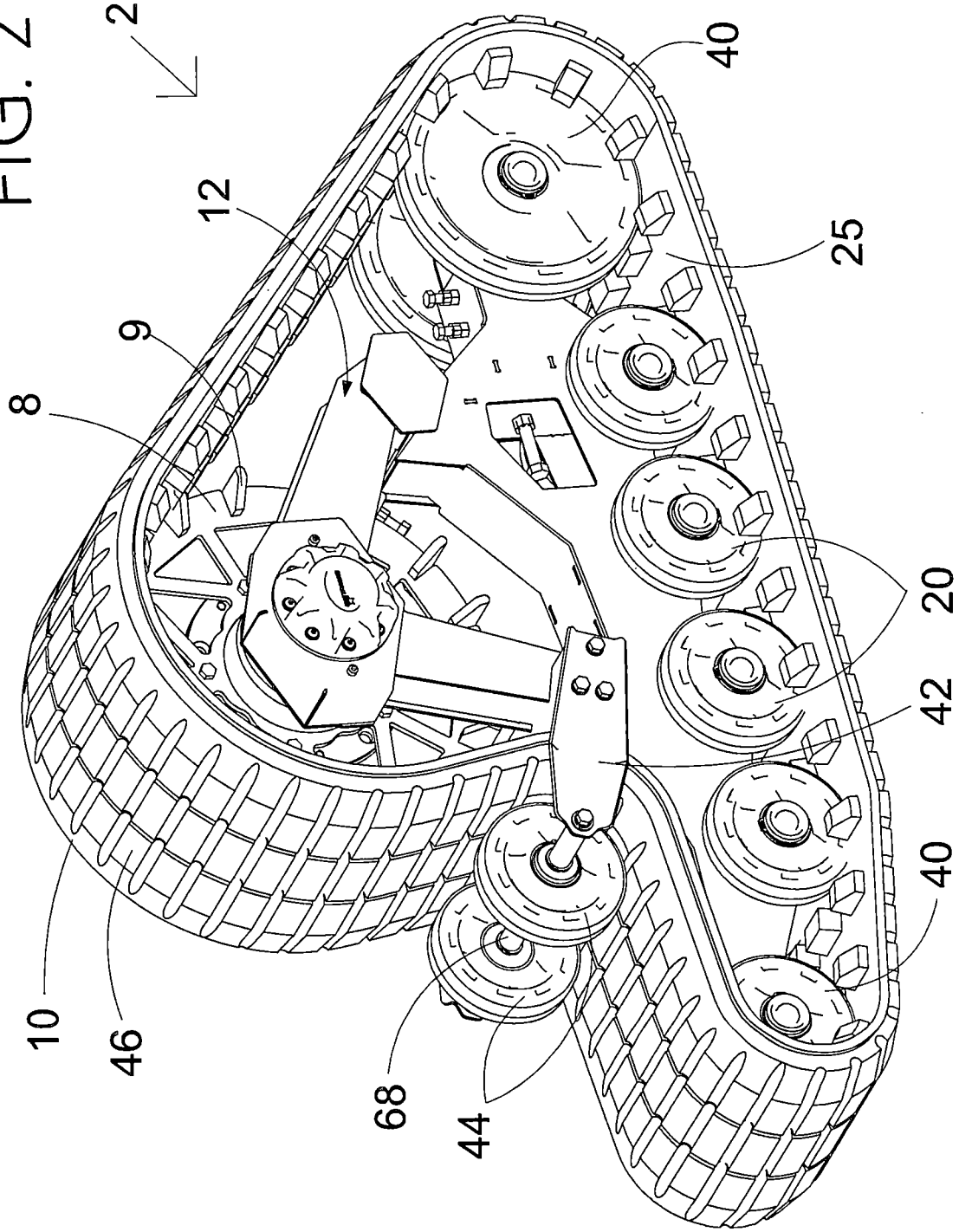
FIG. 2 is a perspective drawing showing the rear, top and front end of the track assembly of FIG. 1.

With attention to FIGS. 1 and 2 an elongated drive track assembly 2 is shown. The drive track assembly 2 is typically secured to an axle that extends from a supported vehicle (not shown). The vehicle axle can be powered or passive. The supported vehicle can be configured to any desired construction or configuration. The subject drive track assembly 2 can be combined with other drive track assemblies secured to a vehicle to appropriately distribute loading and accommodate steering.

A pair of drive track assemblies 2 are typically actively powered via driven axles extending from a passenger compartmented vehicle and coupled to a drive sprocket 8 at the track assembly 2. In some circumstances and/or depending upon the vehicle or equipment type, the drive track assembly 2 can be towed or mounted to passively rotate as the assembly distributes the vehicle's weight over uneven terrain. Typically, the drive track assembly 2 is designed to mount and replace conventional wheels that are normally secured to vehicle axles, although can be adapted to fit and OEM designed vehicle.

The chassis (e.g., passenger, storage and cargo compartments) of the vehicle can be configured to any desired form and shape. Passenger, equipment supports or cargo storage platforms or compartments can be included and/or configured on vehicle support frame members as desired to accommodate any desired load, whether for personnel and/or cargo or equipment transport. An associated drive suspension (not shown) can be configured as desired with an appropriately sized engine, transmission and drive linkage(s) and/or axles coupled to the track assembly(s) 2.

The active and/or passive track assembly 2 can be mounted to steer or passively follow the supported vehicle. The track assembly 2 mounts to couplers and/or linkages that extend between the track assembly 2 and the vehicle axle and/or vehicle and track assembly frame. Presently preferred linkages are described below. For a driven track assembly 2, drive power is supplied from the vehicle to each track assembly 2 via an appropriate drive linkage (not shown) coupled to the track framework and particularly a drive sprocket 8 at the assembly 2. Drive power can be provided from a gas or diesel engine, suitable DC electric motors or combinations thereof.

Track assemblies fitted for vehicle steering typically exhibit a relatively shorter longitudinal length and lighter weight load bearing footprint versus the longer track assembly 2 shown at FIGS. 1 and 2 which are typically mounted to rear axles. The track assembly 2 includes a drive track 10 that is supported from the drive sprocket 8 and a framework 12. The framework 12 can be constructed of cast or plate metals that are cut, laminated, formed and/or welded to a preferred configuration. Whether or not actively powered, the drive sprocket 8 rotates to drive the track 10 as drive lugs, depressions or other suitable appendages or holes at the interior surface of the track 10 are contacted by suitable drive teeth or lugs 9 at the drive sprocket 8. The drive sprocket 8 is presently supported to couple to drive lugs 14 that project from and span an interior surface of the track 10.

Figure 3:
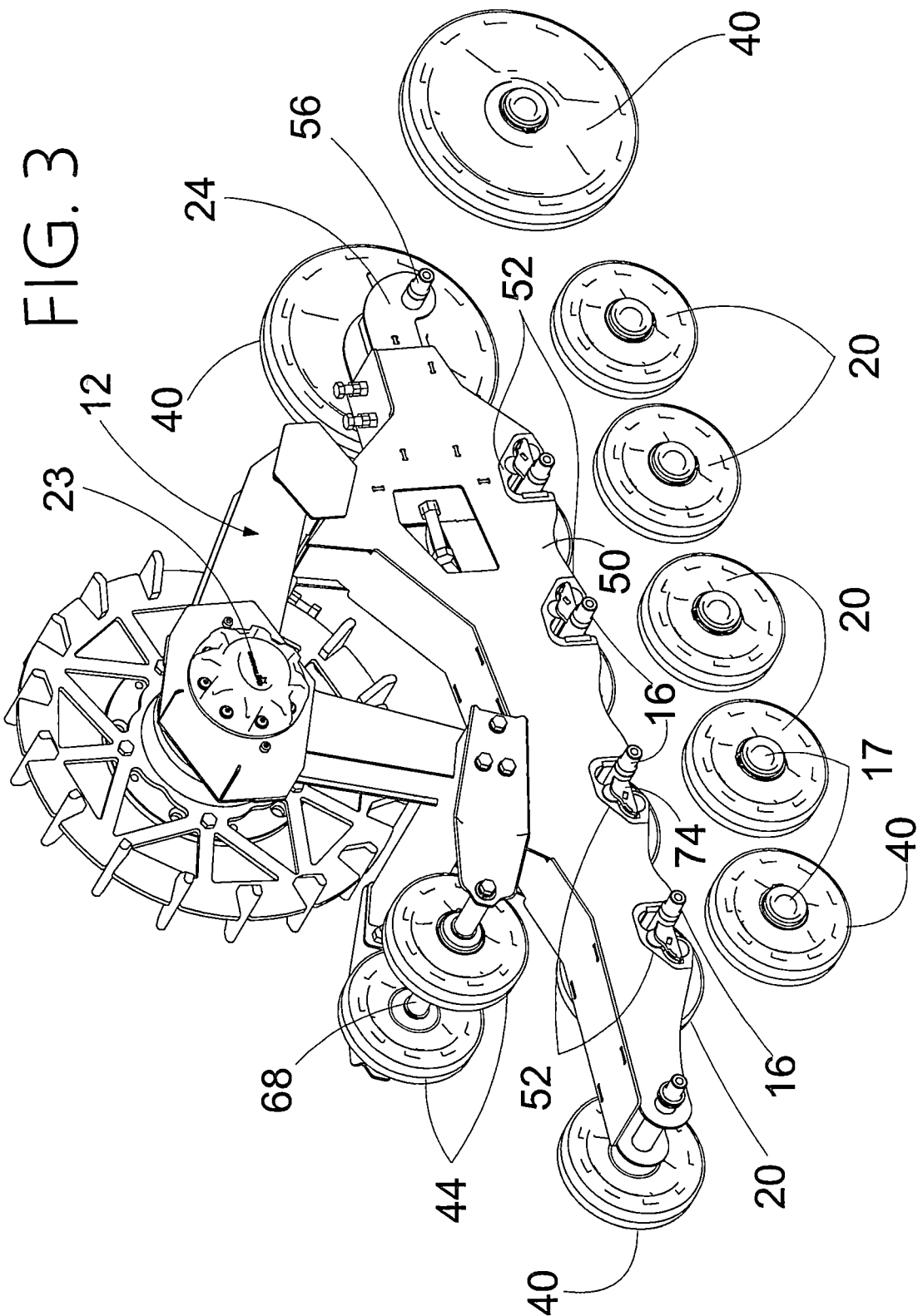
FIG. 3 shows a perspective drawing in exploded assembly of the track assembly of FIG. 1
Figure 4:
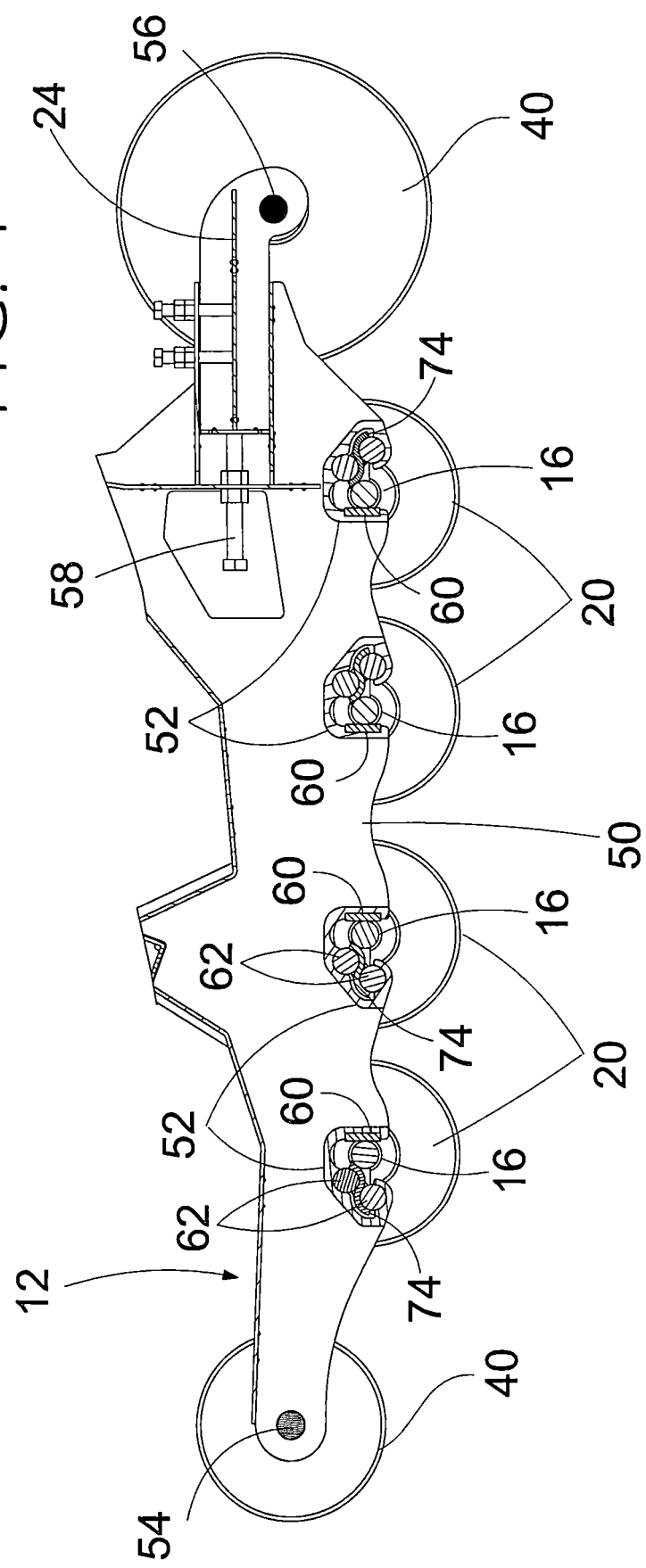
FIG. 4 shows a plan view of the track framework and idler/road wheels with associated resilient, segmented elastomer members mounted to the track framework to independently support the axles and permit the idler/road wheels to pivot, rise and fall at the track framework.
Figure 5:
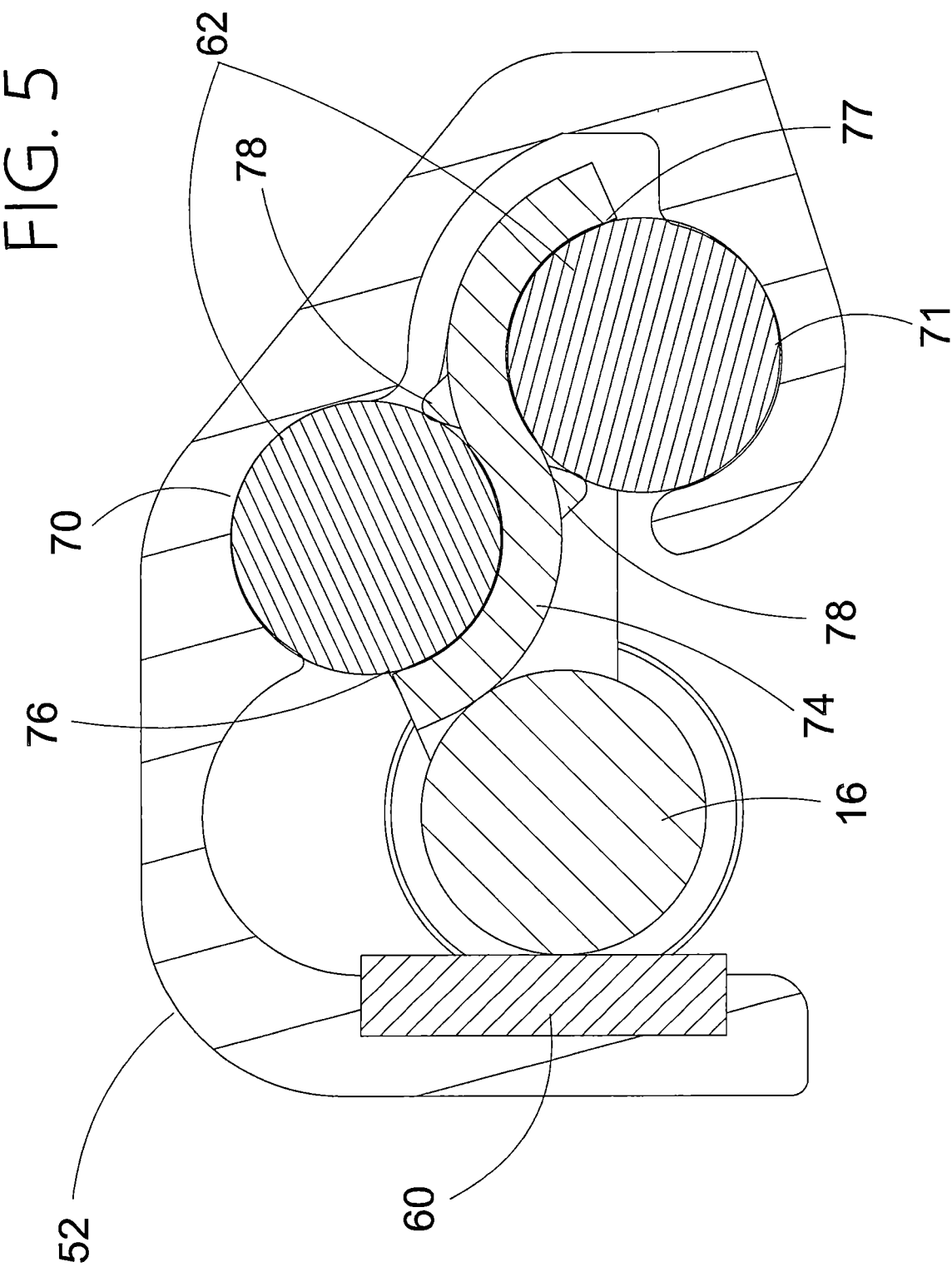
FIG. 5 shows an enlarged cross section view of one of the axle support housings at the framework and the relative mounting positions of an axle wear plate, an idler/road wheel axle having a projecting flange plate and elastomer support cushions fitted to channels formed into the housing between the housing and flange plate.
Figure 6:
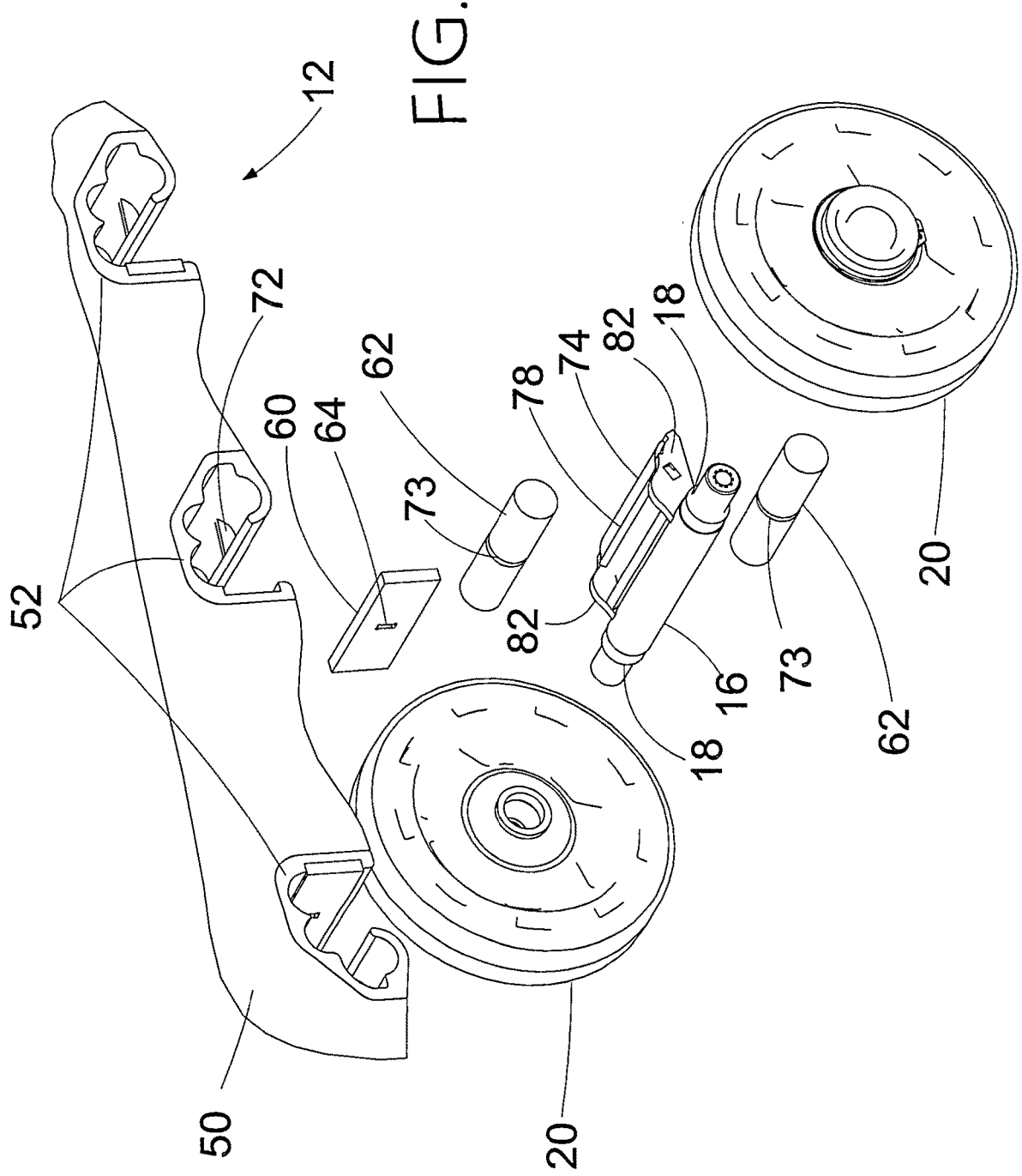
FIG. 6 shows an exploded assembly view of an idler/road wheel axle and extending flange plate, wear plate and elastomer axle support cushions relative to a mating contoured surface and cavity of the axle support housing at the track framework.

With additional attention to FIGS. 3-5 a series of road axles 16 having appended radially projecting flange plates 74 are fitted to the track framework 12. The road axles 16 support paired left and right sets of idler/road wheels 20 that are aligned to engage interior longitudinal channels 25 between the drive lugs 14 along the left and right lateral peripheral edges of the track 10. Each road axle 16 extends through a bearing 17 mounted in the center of each idler/road wheel 20. The idler/road wheels 20 abut shouldered surfaces 18 at the ends of the road axles 16.

Resilient cushions 62 are mounted at the framework 12 to engage the flange plates 74 that project from the road axles 16 and interconnect with the framework 12. The cushions 62 can be formed to any suitable shape from solid to hollow materials. The resilient material preferably exhibits compressive/expansive properties. A variety of resilient materials or resilient composites can be used and presently high density elastomers of suitable durometers are used.

The depicted cushions 62 are configured as bushing-like cylindrical members. The road axles 16 and cushions 62 are particularly mounted within housing members 52 having contoured interior cavities formed to mate with the resilient cushions 62. The housings 52 are attached to the framework 12. The contoured surfaces of the housings 52 can also be formed into multiple plates laminated to the walls of the framework 12 or into the walls of a cast framework. The depicted housings 62 are of modular construction configured to suitable sizes and shapes and are adapted to fasten to the framework 12. The contoured interior surfaces are formed to mate with the resilient cushions 62. The housings 62 might also be constructed to accept inserts formed to include suitable contoured interior cushion support surfaces. The inserts might also be configured as unitary resilient members having protruding surfaces that mate with the axle flange plates. Such inserts might also include an insert molded wear plate 60, among other possible constructions.

With attention to FIG. 4, the forward two axle housings 52 are formed to support two road axles 16 along aft cavity surfaces at adjoining wear plates 60. Movement of the contained forward road axles 16 is thereby constrained to clockwise motions. The aft two axle housings 52 are formed to support two road axles 16 along forward cavity surfaces at adjoining wear plates 60. Movement of the aft road axles 16 is thereby constrained to counter-clockwise motions. Regardless of the mounting location, each of the road axles 16 is able to resiliently and independently pivot, rise and fall relative to the framework 12 in all the axle housings 52 via the interaction between the flange plates 74 and resilient cushions 62.

Extending from a forward end of the framework 12 are left and right sets of ramp/road wheels 40. The ramp/road wheels 40 are longitudinally aligned with the idler/road wheels 20. The ramp/road wheels 40 also contact the internal surface of the track 10, typically in the same channel space 25 as the idler/road wheels 20. From FIG. 3 the forward ramp/road wheels 40 mount to a reciprocating, length extensible/retractable tensioner assembly 24 mounted to the framework 12. The forward road wheels 40 can be extended and retracted relative to the framework 12 to control the tension on the track 10. A separate set of non-extensible ramp road wheels 40 are mounted to an aft end of the framework 12, although could also be mounted to extend and retract.

The tensioner 24 is secured in sliding cooperation with the fore-end of the framework 12 and can be extended and retracted via threaded adjusters 58. A variety of alternative longitudinally adjustable linkages can be adapted to provide a desired reciprocating movement of the tensioner 24 to establish track tension.

Secured to a forward end of the track assembly 2 and coupled to the vehicle frame is a torsion control assembly (not shown). The torsion control assembly interacts with the vehicle frame member and track framework 12 to limit pivoting movements of the track assembly 2. The torsion control assembly particularly prevents unintended contact between the vehicle and track assembly 2.

In some shorter length track assembly constructions, the drive sprocket 8 can be mounted to permit an eccentric adjustment of is rotational center relative to the vehicle axle to vary track tension. Such a mounting assembly 23 can be fitted to the drive sprocket to provide an adjustment that stretches/relaxes the drive track 10 relative to the drive sprocket 8. The drive sprocket 8 can mount to an eccentric bearing having a transverse axle bore located off center. Upon fitting the bearing to a support axle extending from the vehicle, the eccentric bearing and sprocket 8 can be rotated about the vehicle axle to adjust the track tension. Upon fixing the bearing position relative to the sprocket 8 and framework 12, the sprocket 8 rotates in normal fashion about the vehicle axle.

The diameter of the idler/road wheels 20 and fore and aft ramp/road wheels 40 can be selected as desired. Presently, the aft ramp/road wheels 40 exhibit a diameter in a range of 10 to 12 inches. The intermediate idler/road wheels 20 and forward road wheels 40 exhibit a diameter in the range of 5 to 8 inches.

Returning attention to FIGS. 1 and 2, the inclusion of multiple idler/road wheels 20 forward of the drive sprocket 8 extends the length of the track assembly 2. Vehicle and payload weight is thereby spread over a substantially longer distance beneath the vehicle chassis. The drive sprocket 8 at the track assembly 2 mounts to the vehicle axles that typically project from rear wheel wells. Presently and for a typical passenger vehicle, the assembly 2 extends from the rear wheel well to a region just behind the forward driver or passenger doors. The track assembly 2 provides a ground contact footprint at the track 10 approximately 2× to 3× that of a shorter front wheel track assembly that might be mounted to the vehicle's front steering axles.

Separate suspension arms project from the framework 12 forward of the drive sprocket 8 and support a pair of laterally offset pinch wheels 44 from a cross axle 68. The pinch wheels 44 are mounted to contact the external, ground engaging surface of the track 10. The pinch wheels 44 align with and overly the idler/road wheels 20. The pinch wheels 44 ride over the tops of ground lugs 46. The pinch wheels 44 cooperate with the underlying idler/road wheels 20 to pinch the track 10 and drive sprocket 8 between the idler/road wheels 20 and pinch wheels 44 to maintain contact between the sprocket 8 and interior drive lugs 14 and prevent track dislodgement.

The pinch wheels 44 could be mounted to align with gaps or channels between the terrain engaging ground lugs 46. In this configuration, the pinch wheels 44 could be laterally offset from the idler wheels 20. The potential for heat build-up and premature track wear however suggests against such a mounting.

The pinch wheels 44 can be rigidly mounted to the framework 12 or can be resiliently biased to rotationally direct the track 10 toward the sprocket 8 and/or idler/road wheels 20 to prevent track dislodgement. In the fashion of the torsion control assembly 70 discussed below, a resilient, torsional bias can be implemented by fixing elastomer shims or other hydraulic or pneumatic assemblies between transverse end portions of the suspension arms radiating from the vehicle.

With attention to FIGS. 3-10, the framework 12 supports a desired number of left and right idler/road wheels 20 in seriatim intermediate the fore and aft ramp/road wheels 40. It is to be appreciated the idler/road wheels 20 can alternatively be longitudinally staggered in non-symmetrical laterally displaced relation. Each idler/road wheel 20 is captured and suspended in the series of transverse axle housings 52 formed into or attached to the framework 12. As apparent from FIGS. 3 and 4, each of the opposed idler/road wheels 20 fitted to each road axle 16 is supported in an axle housing 52 independent of the other idler/road wheels 20. The rolling surfaces of the idler/road wheels 20 in turn ride in the longitudinal channels 25 defined between the drive lugs 14.

The idler/road wheels 20 are thereby able to independently rotate, pivot, rise and fall in a multi-axial fashion in the axle housings 52 to resiliently conform the track 10 to the terrain and maintain contact between the ground engaging drive lugs 46 and terrain. The collective effect of the present arrangement and independent mounting and resilient biasing of the road axles 16 supporting the idler/road wheels 20, as discussed below, enhances the conformal range of movement of the track 10 and improves ride quality.

With attention to the framework 12, the framework 12 is generally constructed as a box frame. The framework 12 comprises welded top, bottom and side plates 50 that are appropriately positioned to obtain desired support and strength. The road axles 16 project from the axle housings 52 affixed to the side plates 50. As mentioned, the axle housings 52 can be formed from multiple plates laminated to the side plates 50 or as modular housings 52 of suitable size and shape fastened to the side plates 50. Ramp axles 54 and 56, which are not fitted with flanges 74, laterally extend from the forward and aft ends of the framework 12 to support the forward and aft ramp/road wheels 40. The forward ramp/road wheels 40 are mounted to the axle 54 at the tensioner 24.

FIGS. 5-9 depict particular details to the construction of the axle housings 52, the road axles 16 and the manner of suspending the road axles 16 within each axle housing 52. The depicted axle housings 52 are secured to the side plates 50 with suitable fasteners, weldments etc. They can be formed as laminations of several plates secured to the side plates 50. Preferably the axle housings 52 comprise cast or machined housings having suitably shaped interior surfaces and are secured to mating cutouts at the side plates 50. From FIG. 5, each road axle 16 is suspended within each axle housing 52 between a wear plate 60 and a pair of resilient solid cylindrical bushing-like elastomer cushions or bushings 62. A wear plate 60 abuts a side of each axle 16.

Figure 7:
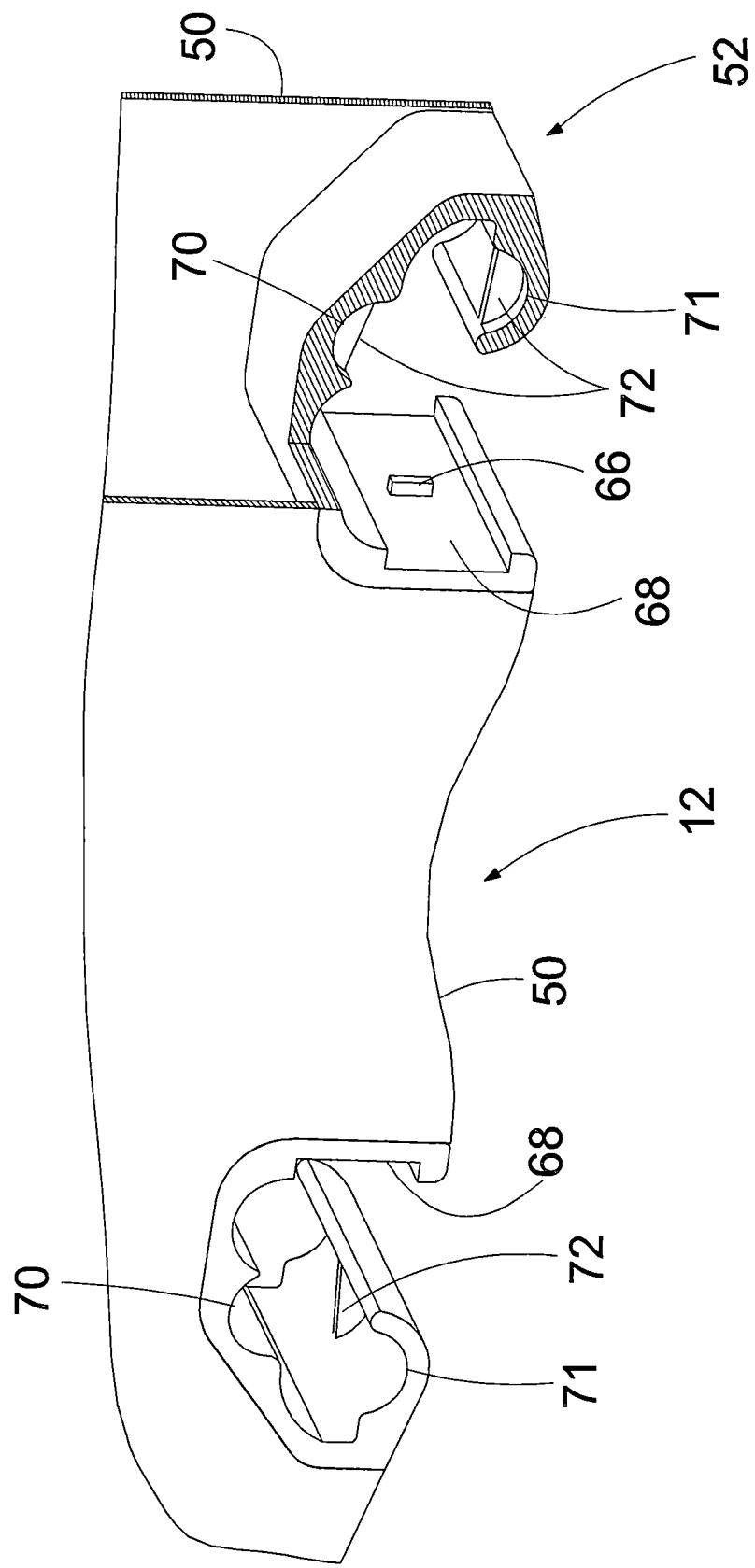
FIG. 7 shows a perspective view of adjacent, opposite facing axle support housings at the track framework.
Figure 8:
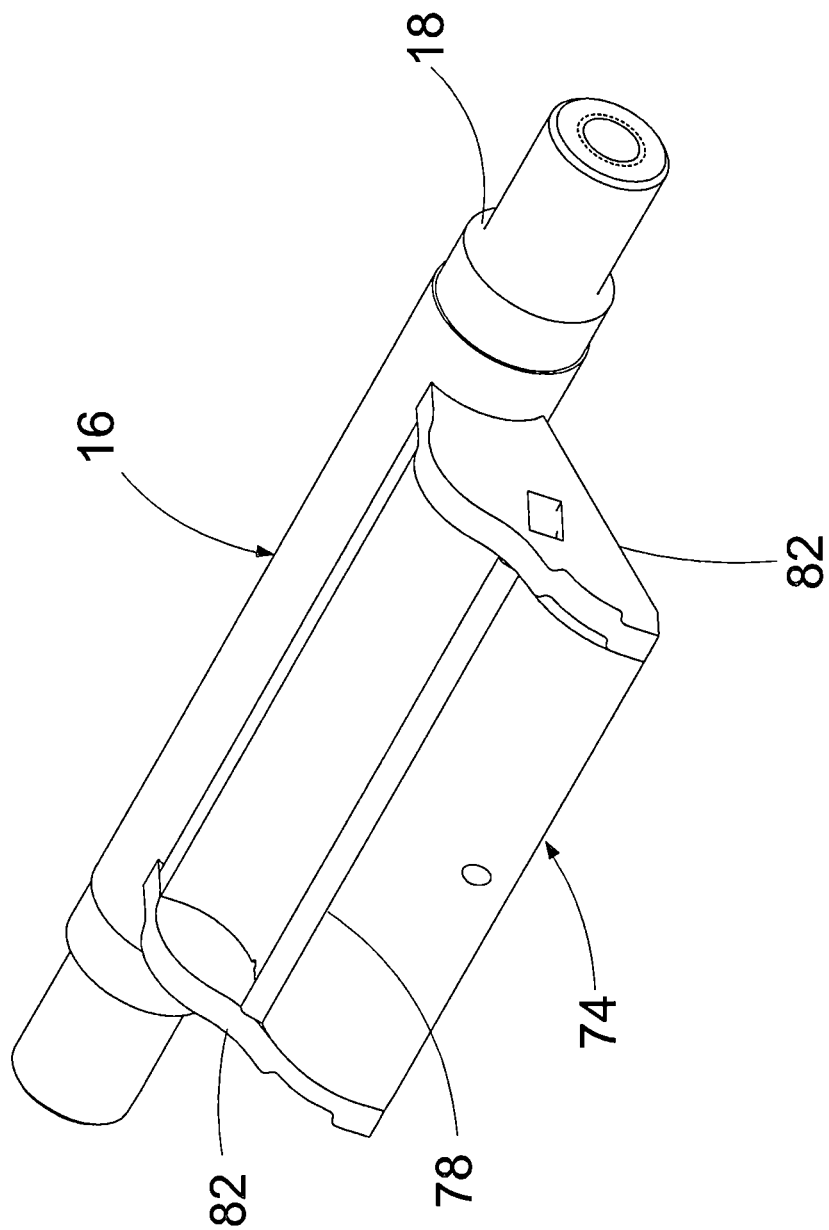
FIG. 8 shows an enlarged perspective view of an idler/road wheel axle and extending flange plate.

Each wear plate 60 includes an aperture 64 (see FIG. 6) that mates with an appendage 66 that projects from a recessed wall 68 of each axle housing 52 (see FIG. 7). The wear plates 60 are constructed of a material which minimizes wear with axle movement. Various high molecular weight, slippery materials, composites or laminates can be used. The wear plates 60 might also include lateral arcuate channels at the contact surfaces between the wear plates 60 and road axles 16. The wear plates 60 might also be molded as part of a resilient insert that mounts to the axle housing 52 and has protruding surfaces that mate with the axle flange plates 74.

The contoured interior surfaces of the axle housings 52 each include lateral arcuate cross channels 70 and 71. The channels 70 and 71 partially support a pair of resilient elastomer bushings 62 at each axle housing 52. Each of the channels 70 and 71 provides a retainer piece 72 that longitudinally projects approximately midway along the channels 70 and 71. A groove 73 formed in each resilient elastomer cushion 62 mounts over each retainer piece 72 to interconnect the resilient elastomer cushions 62 to the channels 70 and 71.

As discussed above, each road axle 16 includes an appended flange plate 74 that extends or radiates from the body of the axle 16. Upper and lower arcuate up-facing and down-facing channels 76 and 77 transversely extend between opposite end walls 82 of the flange plate 74. Transverse ribs 78 extend in parallel alignment with each channel 76 and 77 to facilitate retention of the elastomer cushions 62 to the channels 76 and 77. A cushion retainer piece similar to the retainer pieces 72 can also be provided to vertically project approximately midway along each channel 76 and 77 and mate with the groove 73 in each resilient cushion 62. The end walls 82 align with the side walls 50 of the framework 12 to maintain proper relationship of the road axle 16 and idler/road wheels 20 relative to the framework 12.

Figure 9:
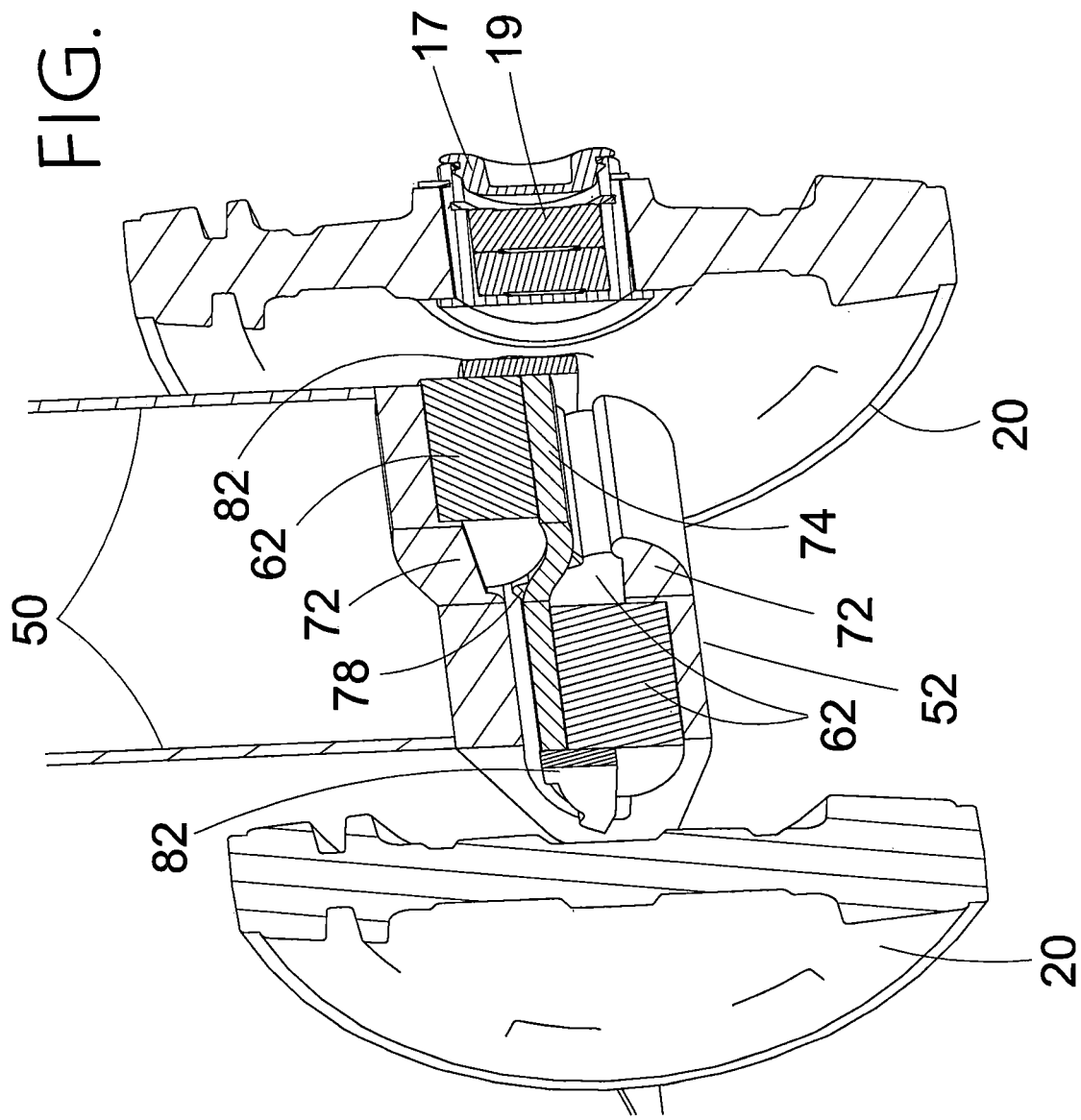
FIG. 9 shows a perspective cross-sectioned assembly view of an idler/road wheel axle and extending flange plate fitted to the track framework and adjoining idler/road wheels.

With additional attention to FIG. 9, the road axles 16 are fitted to the framework by inserting each axle flange 74 into one of the axle housings 52 and locating each resilient cushion 62 into the channels 70 and 71 the retainer pieces 73. The road axle 16 is next elevated/rotated into contact with the wear plate 60. A slight compression of the elastomer cushions 62 secures the axle 16 to the axle housing 52. As desired, an axle retainer can be provided at each axle housing 52, although the weight of the vehicle precludes dislodgement.

The idler/road wheels 20 are next fitted to the ends of the axle 16. The axle ends can mount in roller bearings fitted to the wheels 20. Presently however the axle ends are bedded or encapsulated in cylindrical elastomer bushings 19 and/or needle or ball bearings 17 are fitted to the axle bore of each idler/road wheel 20. The end of each axle 16 is thus cushioned to also independently pivot, rise and fall within the bushings 19 relative to the framework 12. The combined freedoms of axle movement at the idler/road wheels 20 and axle housings 52 at the framework 12 again enhances the collective range of conformal motion of the track 10 and vehicle ride relative to the traveled terrain.

FIG. 10 depicts alternative flexion conditions at two adjacent axle housings 52 compensating for a changing terrain elevation and the typical movements of adjoining road axles 16 coupled to the axle housings 52 and framework 12. In particular, the left idler/road axle 16 is shown elevated onto an illustrative step 90 in the terrain with the axle 16 responding and elevating along the wear plate 60 and rotating the flange plate 74 clockwise to compress the mated elastomer cushions 62 to oppose the rising and pivoting movement of the road axle 16. The right road axle 16, which has not encountered the elevational terrain change, is shown in a normal or rest condition whereat the road axle 16 is centered on the wear plate 60 and with no compression of the elastomer cushions 62. When the aft idler/road wheel 20 encounters and elevates onto the step 90, the cushions 62 at the forward road axle 16 expand and induce the forward road axle 16 to re-center at the wear plate 60. The aft road axle 16 in turn rises and rotates to compress the cushions 62, before returning to a normal unflexed condition one the aft idler/road wheels 20 have passed the step 90.

In combination and with the back-to-back mounting of the road axles 16, the track assembly 2 is provided with an improved resilient idler/road wheel suspension. In distinction to other track assemblies, the idler/road wheels 20 are easily mounted to the framework 12 to resiliently suspend the supporting road axles 16 without the need for associated rocker-type suspension assemblies at the framework 12. A rocker-type suspension however can be included with the track assembly as desired. Existing track assemblies might also be adapted to include the flanged axles 16, axle housings 52 and resilient elastomer cushions 62 discussed above.

Turning attention to FIGS. 11a, 11b and 11c cross-sectioned, perspective assembly views are shown to several arrangements of idler/road wheels 20 secured with modular axle housings 52 to associated undepicted frameworks 12. In particular, exemplary mountings of one, two, and three idler/road wheels 20 are depicted relative undepicted supporting frameworks 12 and wherein one or more flanges appended to and radially extending from each of the idler/road axles 16 resiliently interact with elastomer cushions 62 contained in the axle housings 52. Depending upon the track assembly and load bearing requirements, the axle housings 52 are appropriately sized and shaped to rigidly mount to the track framework 12, support appropriately sized and shaped cushions 62 and laterally displace the idler/road wheels 20 over the terrain.

While the invention is shown and described with respect to a presently considered track assembly and several considered improvements, modifications and/or alternatives thereto, still other assemblies and arrangements may be suggested to those skilled in the art. It is to be appreciated also that the features of the foregoing vehicles and track assemblies can be arranged in different combinations. The foregoing description should therefore be construed to include all those embodiments within the spirit and scope of the following claims.

What is claimed is:

1. A track assembly for a vehicle having a chassis, an engine and a plurality of axles, comprising:
   a) a track having an interior surface from which a plurality of drive lugs project and an exterior surface from which a plurality of ground lugs project and including a surface region defining a footprint whereat the track ground lugs engage the terrain; and
   b) a framework including a drive sprocket, a plurality of idler wheels supported from a plurality of axles and a plurality of housings, wherein each housing contains one of said axles and wherein said track is circumferentially trained around said framework such that the drive lugs engage said sprocket and said idler wheels contact the interior surface of said track;
   c) wherein a plurality of said plurality of axles each include a flange plate projecting from a body of said axle and wherein said flange plate is mounted in one of said housings; and
   d) a plurality of cushion members supported to said housings to contact said flange plates to resist motion of said axles to pivot or rise and fall in said housings, whereby said track idler wheels can independently rise and fall and conform to changing terrain contours.

2. A track assembly as set forth in claim 1 wherein each of said plurality of housings includes a wear plate supported to contact said axle body with movement of said axle in said housing.

3. A track assembly as set forth in claim 2 wherein each of said housings includes projecting appendage and wherein each of said wear plates is adapted to mate with one of said appendages to contain said wear plate to said housing.

4. A track assembly as set forth in claim 2 wherein each of said housings includes a plurality of transverse channels and wherein each of said transverse channels is adapted to support one of said elastomer members to contact said flange plate with movement of said axle in said housing.

5. A track assembly as set forth in claim 4 wherein each of said transverse channels includes a projecting retainer and wherein each of said elastomer members is adapted to mount to said retainer to contact said flange plate with movement of said axle in said housing.

6. A track assembly as set forth in claim 4 wherein said elastomer members include a groove having a shape adapted to interconnect with a retainer projecting from a mating transverse channel.

7. A track assembly as set forth in claim 4 wherein each housing contains a pair of elastomer members and wherein predetermined first housings are positioned to permit a contained one of said axles to move clockwise in said first housings and wherein predetermined second housings are positioned to permit the contained one of said axles to move counter-clockwise in said second housings.

8. A track assembly as set forth in claim 4 wherein each of said flange plates includes a plurality of transverse channels adapted to support portions of each of said elastomer members supported to said housings.

9. A track assembly as set forth in claim 8 wherein each of said flange plates includes an upward facing channel including a retainer member projecting to mount in a groove of a first elastomer member and a downward facing channel including a retainer member projecting to mount in a groove of a second elastomer member such that said first and second elastomer members compress and expand with movement of each of said axles in each of said plurality of housings to independently resist motion of each of said axles to pivot or rise and fall in each of said housings.

10. A track assembly for a vehicle having a chassis, an engine and a plurality of axles, comprising:
   a) a track having an interior surface from which a plurality of drive lugs project and an exterior surface from which a plurality of ground lugs project and including a surface region defining a footprint whereat the track ground lugs engage the terrain; and
   b) a framework including a drive sprocket, a plurality of idler wheels supported from a plurality of axles and a plurality of housings, wherein each housing contains one of said axles, wherein each housing includes a transverse channel and wherein said track is circumferentially trained around said framework such that the drive lugs engage said sprocket and said idler wheels contact the interior surface of said track;
   c) wherein a plurality of said plurality of axles each include a flange plate projecting from a body of said axles and wherein said flange plate is mounted in one of said housings;
   d) wherein each of said housings includes a wear plate supported to contact said axle body with movement of said axle in each of said housings;
   e) a plurality of elastomer members supported to said housings to contact each flange plate such that movement of each of said flange plates in each of said housings compresses or expands each of said elastomer members to resist motion of said axles to pivot or rise and fall in each of said housings, whereby said idler wheels can independently rise and fall and induce said track to conform to changing terrain contours.

11. A track assembly as set forth in claim 10 wherein each of said housings includes a plurality of transverse channels and wherein each of said transverse channels is adapted to support one of said elastomer members to contact the flange plate of said axles mounted to each of said housings.

12. A track assembly as set forth in claim 11 wherein each of said transverse channels includes a projecting retainer and wherein each of said elastomer members is adapted to mount to said retainer and contact said flange plate with movement of said axle in said housing.

13. A track assembly as set forth in claim 11 wherein said elastomer members include a groove having a shape adapted to mate with a retainer projecting from a mating channel.

14. A track assembly as set forth in claim 10 wherein each housing contains a pair of elastomer members and wherein predetermined first housings are positioned to permit a contained one of said axles to move clockwise in said first housings and wherein predetermined second housings are positioned to permit the contained one of said axles to move counter-clockwise in said second housings.

15. A track assembly as set forth in claim 10 wherein each of said flange plates includes a plurality of transverse channels adapted to support portions of each of elastomer members to said flange plates supported to said housings.

16. A track assembly as set forth in claim 15 wherein each of said flange plates includes an upward facing channel including a retainer member projecting to mount in a groove of a first elastomer member and a downward facing channel including a retainer member projecting to mount in a groove of a second elastomer member such that said first and second elastomer members compress and expand with movement of each of said flange plates in each said plurality of housings.

17. A track assembly for a vehicle having a chassis, an engine and a plurality of axles, comprising:
a) a track having an interior surface from which a plurality of drive lugs project and an exterior surface from which a plurality of ground lugs project and including a surface region defining a footprint whereat the track ground lugs engage the terrain; and
b) a framework including a drive sprocket, a plurality of idler wheels supported from a plurality of axles and a plurality of housings, wherein each housing contains one of said axles, wherein each housing includes first and second transverse channels and wherein said track is circumferentially trained around said framework such that the drive lugs engage said sprocket and said idler wheels contact the interior surface of said track;
c) wherein a plurality of said plurality of axles each include a flange plate projecting from a body of said axle, wherein each flange plate includes first and second transverse channels and wherein each flange plate mounts in one of said housings;
d) wherein each of said housings includes a wear plate supported to contact said axle body with movement of each of said axles in each of said housings;
e) a plurality of elastomer members supported between the first and second channels of each of said housings and said flange plate at each housing such that movement of each of said flange plates in each of said housings compresses or expands each of said elastomer members to resist motion of said axles to pivot or rise and fall in each of said housings, whereby said idler wheels can independently rise and fall and induce said track to conform to changing terrain contours.

18. A track assembly as set forth in claim 17 wherein each of said first and second channels at each housing includes a projecting retainer adapted to mount to first and second ones of said elastomer members at each of said housings.

19. A track assembly as set forth in claim 18 wherein each of said first and second ones of said elastomer members includes a groove interconnected to one of said retainers.

20. A track assembly as set forth in claim 18 wherein each of said flange plates includes an upward facing channel having a retainer member projecting to mount in the groove of a first elastomer member and a downward facing channel having a retainer member projecting to mount in the groove of a second elastomer member.

* * * * *